(12) United States Patent
Sarkar et al.

(10) Patent No.: US 10,565,981 B2
(45) Date of Patent: Feb. 18, 2020

(54) COMPUTER-ASSISTED CONVERSATION USING ADDRESSIBLE CONVERSATION SEGMENTS

(71) Applicant: Microsoft Technology Licensing, LLC, Redmond, WA (US)

(72) Inventors: Angshuman Sarkar, Bellevue, WA (US); John Anthony Taylor, Bellevue, WA (US); Henrik Frystyk Nielsen, Hunts Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 15/716,255

(22) Filed: Sep. 26, 2017

(65) Prior Publication Data
US 2019/0096391 A1   Mar. 28, 2019

(51) Int. Cl.
G10L 15/06   (2013.01)
G10L 15/22   (2006.01)
G06F 16/23   (2019.01)

(52) U.S. Cl.
CPC .......... *G10L 15/06* (2013.01); *G06F 16/2365* (2019.01); *G10L 15/22* (2013.01); *G10L 2015/221* (2013.01)

(58) Field of Classification Search
None
See application file for complete search history.

(56) References Cited

U.S. PATENT DOCUMENTS

| | | | |
|---|---|---|---|
| 6,629,087 B1 | 9/2003 | Benson et al. | |
| 6,757,362 B1 * | 6/2004 | Cooper | H04M 3/527 379/88.01 |
| 8,060,365 B2 * | 11/2011 | Itoh | G10L 15/26 704/235 |
| 9,118,429 B2 * | 8/2015 | Bourakov | H04H 20/61 |
| 2014/0272821 A1 * | 9/2014 | Pitschel | G09B 19/06 434/157 |

(Continued)

FOREIGN PATENT DOCUMENTS

EP    2851814 A1    3/2015

OTHER PUBLICATIONS

"International Search Report and Written Opinion Issued in PCT Application No. PCT/US2018/039221", dated Sep. 28, 2018, 11 Pages. (MS# 402712-WO-PCT).

(Continued)

*Primary Examiner* — Neeraj Sharma
(74) *Attorney, Agent, or Firm* — Workman Nydegger

(57) ABSTRACT

At least some embodiments described herein relate to computer-assisted conversation. The set of available conversation segments is updated by addressing conversation segments at the granularity of a conversation segment or a group of conversation segments. For instance, an entire class of conversation segments may be addressed to add, delete, turn on, or turn off, the class of conversation segments. Groups of class of conversation segments may also be similarly addressed. Thus, as the scope of a conversation changes, the available set of conversation segments may likewise change with fine-grained control. Accordingly, rather than pre-plan every set of possible conversations, the context and direction of the conversation may be evaluated by code to thereby determine what new sets of conversation segments should be added, deleted, turned on, or turned off. New conversation segments may even be generated dynamically, taking into account the values of parameters that then exist.

16 Claims, 4 Drawing Sheets

(56) References Cited

U.S. PATENT DOCUMENTS

| | | | | |
|---|---|---|---|---|
| 2015/0081658 A1* | 3/2015 | Meyles | ................ | G06F 16/273 |
| | | | | 707/706 |
| 2015/0350143 A1* | 12/2015 | Yang | .................... | G06F 3/0482 |
| | | | | 345/173 |
| 2017/0372442 A1* | 12/2017 | Mejias | .................... | G06F 19/32 |
| 2018/0061402 A1* | 3/2018 | Devaraj | ................. | G10L 15/22 |
| 2018/0330721 A1* | 11/2018 | Thomson | ............ | G10L 15/1815 |
| 2019/0057143 A1* | 2/2019 | Porter | ................ | H04L 12/1822 |
| 2019/0172444 A1* | 6/2019 | Hiroe | ................. | G06F 17/2755 |
| 2019/0206406 A1* | 7/2019 | Sugiyama | ............ | B25J 11/0005 |

OTHER PUBLICATIONS

"RiveScript::Tutorial—Learn to write RiveScript code.", https://web.archive.org/web/20150214065211/https://www.rivescript.com/docs/tutorial, Published on: Feb. 14, 2015, 18 pages.

"What is SuperScript", https://github.com/superscriptjs/superscript/wiki, Retrieved on: Jun. 23, 2017, 2 pages.

"Dota Bot Scripting—Valve Developer Community", https://developer.valvesoftware.com/wiki/Dota_Bot_Scripting, Retrieved on: Jun. 23, 2017, pp. 1-38.

Patel, et al., "Designing BOTs with BDI Agents", In Proceedings of International Symposium on Collaborative Technologies and Systems, May 18, 2009, 7 pages.

McClendon, Bomani, "Getting started with conversational bots using Wit.ai", https://knightlab.northwestern.edu/2016/05/23/getting-started-with-conversational-bots-using-wit-ai/, May 23, 2016, 13 pages.

Klopfenstein, et al., "The Rise of Bots: A Survey of Conversational Interfaces, Patterns, and Paradigms", In Proceedings of the Conference on Designing Interactive Systems, Jun. 10, 2017, pp. 555-565.

Brandl, et al. "Create a bot with the Bot Builder SDK for Node.js", https://docs.microsoft.com/en-us/bot-framework/nodejs/bot-builder-nodejs-quickstart, Jun. 13, 2017, 8 Pages.

* cited by examiner

COMPUTER-ASSISTED CONVERSATION USING ADDRESSABLE CONVERSATION SEGMENTS

BACKGROUND

Computing systems and associated networks have greatly revolutionized our world. Computing systems are now able to engage in some level of conversation with a human user. For instance, a user trigger a computing system to engage in a conversation by calling out a particular name. The computing system then sits at the ready to hear a possible user statement. A natural language engine then interprets the statement to determine the intent of the user statement. The computing system then processes that statement to then determine an appropriate response. For instance, the computing system might play a song, order a product, and/or say an utterance in response.

One conventional method for creating conversation allows for the user of conversation segments in which an appropriate response to a particular utterance or class of utterances is defined. Such definitions may even be given in declarative form, allowing for easy definition of the conversional segment. An example of a language that enables such declarative definitions is RiveScript. In this model, the computing system listens for a user statement that matches a previously defined conversation segment, and then users the declarative definition of the conversation segment to determine an appropriate response. The appropriate response is then uttered.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to computer-assisted conversation. In the environment of computer-assisted conversation, there are conversation segments that each include a correlation between statement data and at least one computerized response. When a user statement is detected that matches the statement data, the corresponding conversation segment is found, and an appropriate computer-assisted response is audibly emitted by the computing system. Such conversation segments may be authored via declarations that define the statement data, and the corresponding response. The match of the user statement may be an exact match to the statement data of one of the available conversation segments. Alternatively or in addition, artificial intelligence may be used to find a match between a user statement and resembling statement data of the available conventional segments.

In accordance with the principles described herein, the set of available conversation segments is updated by addressing conversation segments at the granularity of a conversation segment or a group of conversation segments. For instance, an entire class of conversation segments may be addressed to add, delete, turn on, or turn off, the class of conversation segments. Groups of classes of conversation segments may also be similarly addressed.

Thus, as the scope of a conversation changes, the available set of conversation segments may likewise change with fine-grained control. The available set of conversation segments might dynamically change depending on the flow of the conversation and/or a change to the context of a service that triggers the dynamic change. Accordingly, rather than pre-plan every set of possible conversations, the context and direction of the conversation may be generated dynamically to thereby determine what conversation segments should be added, deleted, turned on, or turned off. New conversation segments may even be generated dynamically, taking into account the values of parameters that then exist. For instance, such parameters may even include the state of remote systems, such as back-end systems.

Thus, the computing system is flexible enough to be ready for new conversation based on current information as the scope of the conversation migrates and/or as the conversation service changes context. This allows for much more realistic and helpful conversations with a computing system, as the computing system follows the context of the current conversation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
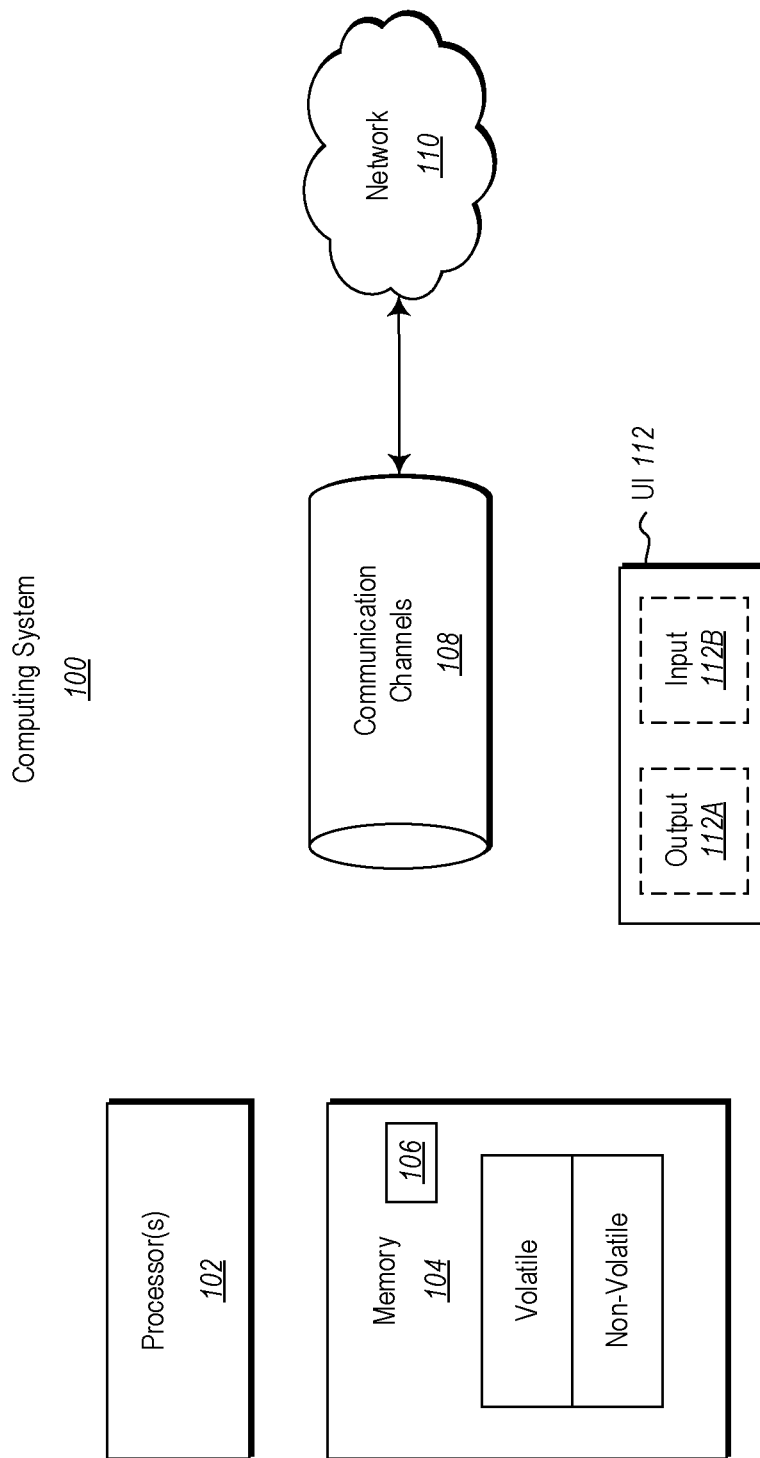
FIG. 1 illustrates an example computer system in which the principles described herein may be employed.

At least some embodiments described herein relate to computer-assisted conversation. In the environment of computer-assisted conversation, there are conversation segments that each include a correlation between statement data and at least one computerized response. When a user statement is detected that matches the statement data, the corresponding conversation segment is found, and an appropriate computer-assisted response is audibly emitted by the computing system. Such conversation segments may be authored via declarations that define statement data, and the corresponding response. The match of the user statement may be an exact match to the statement data of one of the available conversation segments. Alternatively or in addition, artificial intelligence may be used to find a match between a user statement and resembling statement data of the available conventional segments.

In accordance with the principles described herein, the set of available conversation segments is updated by addressing conversation segments at the granularity of a conversation segment or a group of conversation segments. For instance, an entire class of conversation segments may be addressed to add, delete, turn on, or turn off, the class of conversation segments. Groups of classes of conversation segments may also be similarly addressed.

Thus, as the scope of a conversation changes, the available set of conversation segments may likewise change with fine-grained control. The available set of conversation segments might dynamically change depending on the flow of the conversation and/or a change to the context of a service that triggers the dynamic change. Accordingly, rather than pre-plan every set of possible conversations, the context and direction of the conversation may be generated dynamically to thereby determine what conversation segments should be added, deleted, turned on, or turned off. New conversation segments may even be generated dynamically, taking into account the values of parameters that then exist. For instance, such parameters may even include the state of remote systems, such as back-end systems.

Thus, the computing system is flexible enough to be ready for new conversation based on current information as the scope of the conversation migrates and/or as the conversation service changes context. This allows for much more realistic and helpful conversations with a computing system, as the computing system follows the context of the current conversation.

Because the principles described herein operate in the context of a computing system, a computing system will be described with respect to FIG. 1. Then, the principles of computerized conversation will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
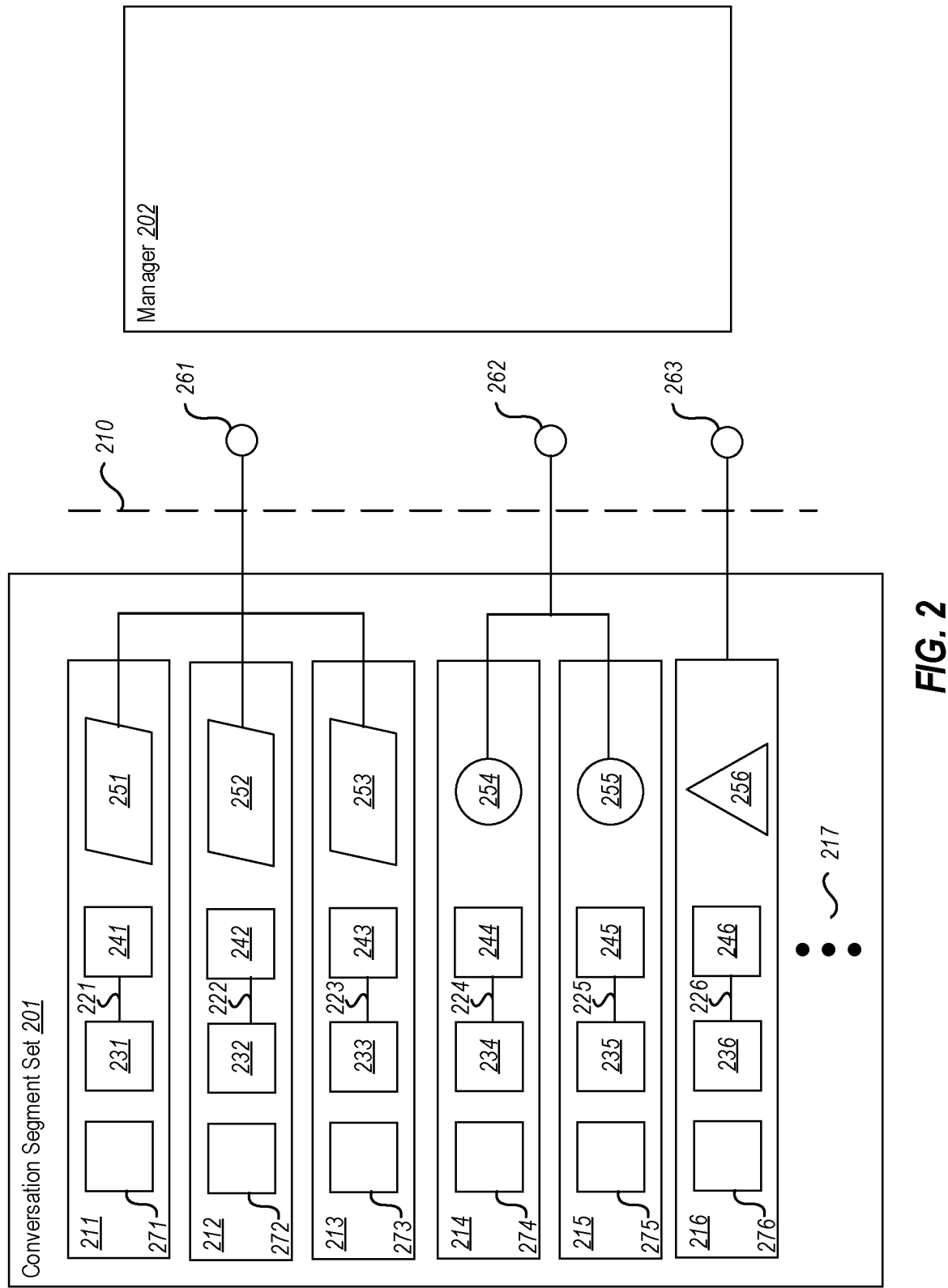
FIG. 2 illustrates an example environment that operates using an addressable set of conversation segments, and a manager that interfaces with the conversation segments using the addressing provided by the conversation segments.

FIG. 2 illustrates an example environment 200 that operates using an addressable set 201 of conversation segments, and a manager 202 that interfaces with the conversation segments using the addressing provided by the conversation segments. The addressable set 201 of conversation sets may also be referred to in this description and in the claims as an "available set of conversation segments" since the manager 202 can interface with this set. In the example conversation segment set 201, there are six conversation segments 211 through 216. However, the ellipses 217 represent that the principles described herein may be used for available sets of any number of conversation segments. The manager 202 may be a computing system, such as the computing system 100 of FIG. 1. Alternatively or in addition, the manager 202 may be an executable component, such as the executable component 106 of FIG. 1. The manager 202 interfaces with the conversation segment set 201 via an Application Program Interface (API) 210. The conversation segment set 201 may be local to or remote from the manager 202.

Each conversation segment includes at least correlation between statement data and at least one computerized response that is responsive to user statements that match the statement data. The match of the user statement may be an exact match. Alternatively or in addition, artificial intelligence may be used to find a match between a user statement and resembling statement data of available conventional segments.

For instance, conversation segments 211 through 216 include a correlation 221 through 226, respectively, between a statement data 231 through 236, respectively, and responses 241 through 246, respectively. The statement data may include, for instance, text of statements or portions of statements that might be spoken by a user (e.g., "Hello"). The statements might also include data that represents types of statements or portions of statements that may be spoken by a user (e.g., Greeting, or [Name] as in "My name is [Name]").

Each conversation segment 211 through 216 is addressable using respective the address identifiers 251 through 256, and includes a respective status 271 through 276. The purpose of the address identifiers and the status will be described further below with respect to FIG. 5.

Figure 3:
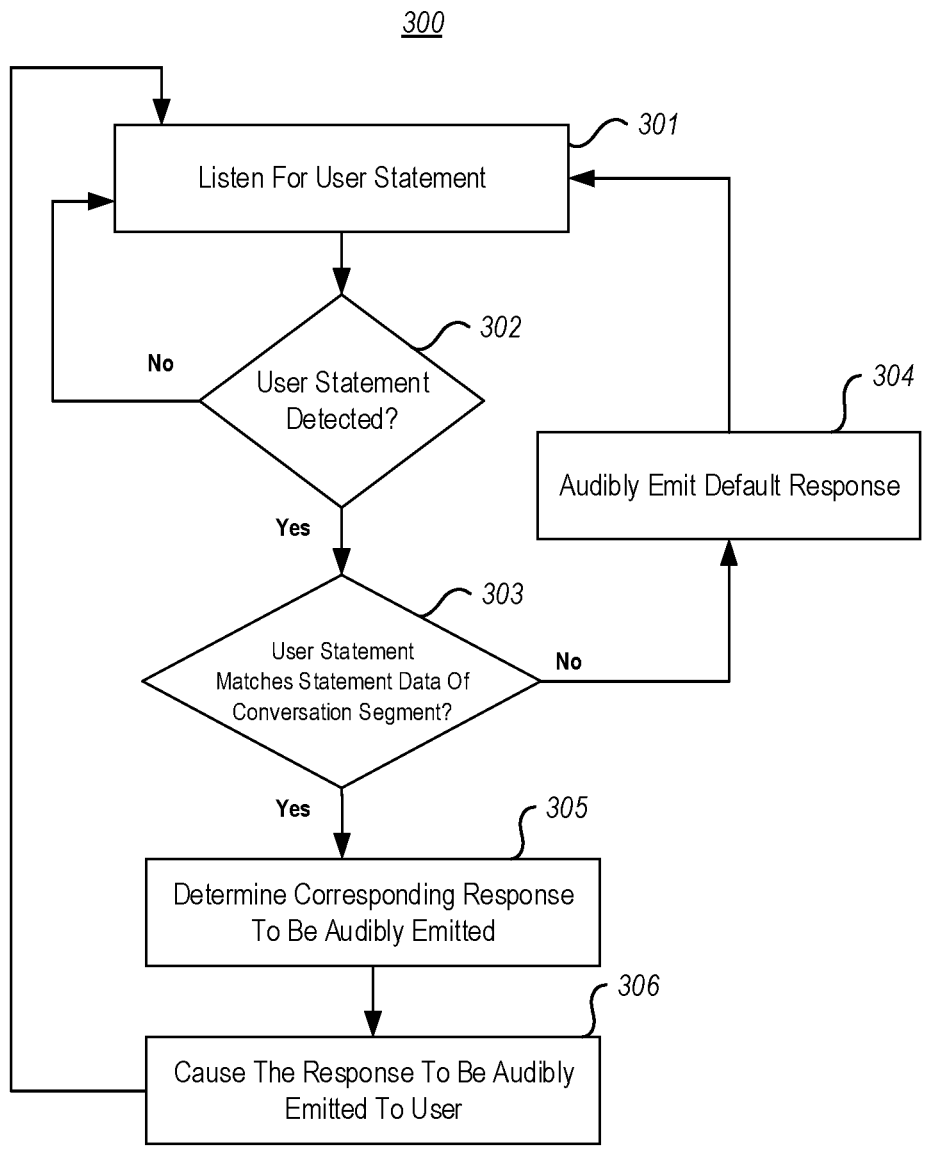
FIG. 3 illustrates a method for using the available set of conversation segments to perform computer-assisted conversation.

Before describing the principles in accordance with embodiments described herein in further detail, a mechanism for using and managing conversation segments will be described with respect to FIGS. 3 and 4. FIG. 3 illustrates a method 300 for using the available set of conversation segments to perform computer-assisted conversation. The method 300 includes listening for a user statement (act 301). This may be accomplished using, for instance, a natural language engine of a computing system. For instance, if the method 300 is implemented by the computing system 100 of FIG. 1, that natural language component may be or include an executable component 106 of the computing system. If a user statement is not detected ("No" in decision block 302), then the computing system continues to listen for a user statement (returning to act 301).

However, once a user statement is detected ("Yes" in decision block 302), the computing system determines whether or not that user statement matches statement data of a conversation segment (decision block 303) of the available set of conversation segments. For instance, in the context of FIG. 2, the computing system may determine whether or not the user statement matches the statement data 231 through 236 of the conversation segment set 201. As an example, if the user statement is "Hi", the computing system may try to find statement data of "Hi" amongst the statement data 231 through 236 of the available conversation segment set 201. Alternatively or in addition, the computing system may use artificial intelligence to match the user statement to statement data of "Hello" or statement data of "[Greeting]" should that statement data exist amongst the available conversation segment set 201.

If the computing system does not find statement data that matches the user statement ("No" in decision block 303), then the method 300 returns to continue listening for a user statement (act 301) after potentially audibly emitting some default response (act 304) such as "I don't understand".

On the other hand, if the computing system finds statement data that matches the user statement ("Yes" in decision block 303), the computing system determines that the corresponding response of the corresponding conversation segment is to be audibly emitted (act 305). For instance, referring to FIG. 2, if a user statement matching user data 233 is detected, then the computing system determines that the response 243 is an appropriate response. The computing system then causes the response to be audibly emitted to the user (act 306). The method 300 then returns to listen for the next user statement (act 301), thereby allowing the conversation to continue.

Figure 4:
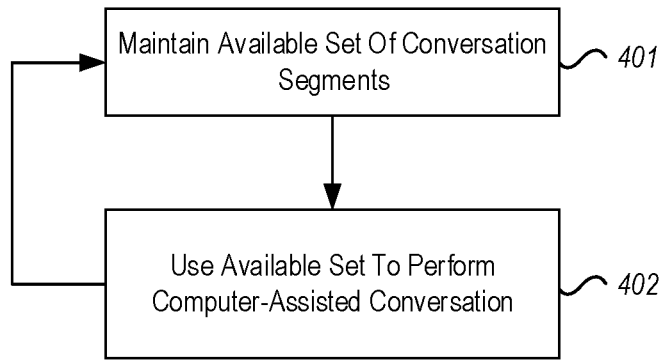
FIG. 4 illustrates a flowchart of a method for performing computer-assisted conversation.

FIG. 4 illustrates a flowchart of a method 400 for computer-assisted conversation. The method 400 includes maintaining an available set of conversion segments at the computing system (act 401), and using the available set of conversation segments to perform computer-assisted conversation (act 402). An example of the available set of conversation segments has been described with respect to the conversation segment set 201 of FIG. 2. An example of the using of the available set of conversation segments (act 402) has been described with respect to FIG. 3.

The principles described herein allow for fine-grained control to update the set of available conversation segments. Referring to FIG. 2, this may be accomplished via the use of the manager 202 interfacing with the conversation segment set 201 using the API 210 and the addressing mechanism. As an example, each of the conversation segments 211 through 216 includes an addressing identifier 251 through 256 (also called "individual addresses" herein). Alternatively or in addition, groups of the conversation segments may be addressed using the group addressing identifiers 261 through 263 (also called "group addresses" herein). By convention, the individual addresses of a common group address are represented with the same shape. For instance, individual addresses 251 through 253 are each represented as a parallelogram as they each have the same group address 261.

For instance, the example of FIG. 2 shows that there are three unique group addresses 261 through 263. Conversation segments 211, 212 and 213 have one unique address 261 as visually symbolized by the individual addresses 251, 252 and 253 being parallelograms. Conversation segments 214 and 215 have a second group address 262 as visually symbolized by the individual addresses 254 and 255 being circles. Conversation segment 216 has a third group address 263 as represented by the individual address 256 being triangular.

Accordingly, the manager 202 might address conversation segments 211 through 213 using a single group address 261; conversation segments 214 and 215 using a single group address 262; or conversation segment 216 as a group address 263. Alternatively, multiples of the group addresses 261 through 263 may be used by the manager 202. For instance, to address all conversation segments 211 through 215, the manager 202 may use both group addresses 261 and 262. To address conversation segments 211 through 213 and 216, the manager 202 may use both group addresses 261 and 263. To address conversation segments 214 to 216, the manager 202 may use both group addresses 262 and 263. In one example, the addresses 261 through 263 are grouped by classes of conversation segments.

Alternatively or in addition, the manager 202 may address individual conversation segments 211 through 216 by their respective individual address 251 through 256, that are unique for each conversation segment. To address conversation segment 211, for instance, the manager 202 might just use individual address 251. To address, segments 211 through 214, the manager 202 might use group address 261 and individual address 254. The example conversation segment set 201 has been kept simple for purposes of clarity.

However, the principles described herein may be extended to conversation segment sets that include any number of conversation segments and any number of classes of conversation segments.

Various examples of a declarative form for expressing the conversation segments will now be described. The principles described herein are not to be construed as limited to these forms. In the following examples, statement data is included within lines that have the plus "+" prefix. Such lines are also referred to herein as "recognizer elements". Responses are included within lines that have the minus "−" prefix. Such lines are also referred to as herein as "response elements". The following is a first example:

```
+ hi {id:helloRecognizer, class:recognizerElement}
− hello human {id:helloResponse, class:responseElement}
```

In this example declarative conversation segment, "hi" is the statement data. If the user says "hi", the computing system respond with an audible "hello human". This declarative form includes an addressing system that includes both a group address "responseElement" or "recognizerElement", and a corresponding individual address "helloRecognizer" or "helloResponse". Either address may be used to operate upon this conversation segment. Although the first example expressly statements the group and individual addresses, the group and individuals may be omitted if they are a default group and individual address. In the subsequent examples, assume that the default group address of the recognizer element and response element is "recognizerElement" and "responserElement", respectively. Assume also, that the default individual address of this default recognizer and response is "helloRecognizer" and "helloResponse", respectively.

The following is a second example in which there is a set of statement data:

```
+ hi {id:firstHi}
+ hello {id:SecondHi}
− hello human
```

Here, the statement data is both "hi" and "hello". If the computing system detects either a "hi" or a "hello" statement from the user, the computing system emits "hello human" as the audible response. Here, the conversation segment may be addressed by either of the default class address "responseElement" and "recognizerElement" since neither a response or recognizer group address is specified. The conversation segment may also be addressed by the individual address "firstHi" or "secondHi" since they are expressly included within the recognizer element of this example. The conversation segment may also be address by the individual address "helloResponse" since both the group and individual addresses for the response element are left blank, leaving "helloResponse" as the default individual address of the response element.

The following third example shows that a recognizer can be a code recognizer.

```
+ {call:funcl}
− please proceed
```

In this case, if the user were to say something, the function "funcl" would be called and the user statement provided to the function. That function would either return true or false, depending on whether the function determined that the user statement was a match. For instance, the function might return true if the user statement was "Hello" and otherwise return false. If the function returned true, then the computing system emits an audible response of "please proceed". Here, since no group or individual addresses are specified, the conversation segment may be addressed using the default group addresses "responseElement" or "recognizerElement".

The statement data could also include mentions of intent. For instance, the statement data of the recognizer element might be "intent:makePizza". In that case, any user statement which the computing system could interpreted via artificial intelligence to mean that the user intends to have pizza could be considered to be a match. In that case, the response element of the conversation element might include the response "Sure. I can help you with ordering a pizza."

The statement data could also declaration of a listen event. The listen event is fired when statement data of a recognizer element matches. If the programmer wishes to capture this event, then she can provide a function name in the following way to have the function get called when the recognizer matches. This happens before the corresponding respond element is considered.

```
+ hi {listen:onHello, id:helloId}
− sure. I can help you with ordering a pizza.
```

The function could be defined as something like the below:

```
{
    onHello: function (input, context) {
        //....
    }
}
```

The following example shows that a respond event can be fired when a respond element is executed and after the text has been added to the response to the user.

```
+ hi
− sure. I can help you with ordering a pizza {respond: onRespond}
```

An onRespond callback can have access to everything that a listen callback has access to.

A response element might include actual text to be audibly emitted to a user as in the above examples. Alternatively or in addition, the response element might include identification of code that is run to generate the response that is to be audibly emitted to the user. Thus, there is enormous variety in how statement data and corresponding responses can be identified within conversation segment.

Figure 5:
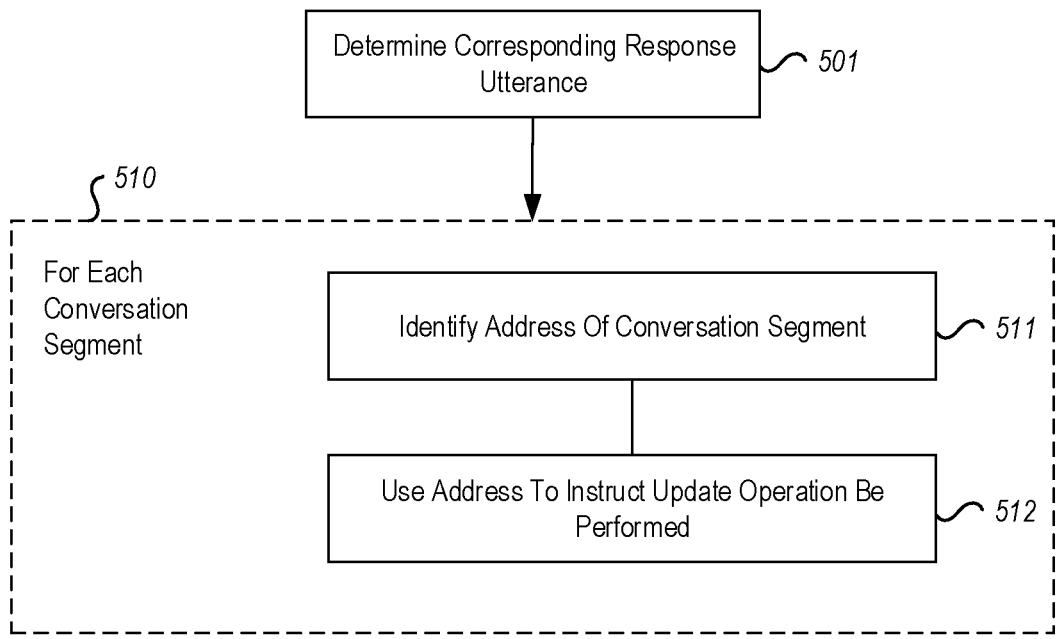
FIG. 5 illustrates a flowchart of a method for updating an available set of conversation segments in accordance with the principles described herein.

FIG. 5 illustrates a flowchart of a method 500 for updating an available set of conversation segments. The method 500 may be performed by the manager 202 of FIG. 2. First, the manager 202 determines a conversation segment(s) on which to perform an update operation (act 501). Then, as represented by the context of box 510 the update is performed for each determined conversation segment(s).

Specifically, for each conversation segment that is to be updated, the address for that conversation segment is identified (act 511). If all of the conversation segments of a given group are to be updated, then the group address may be used. Then, using the appropriate address, the manager instructs that the conversation segment have the operation performed thereon (act 512). This causes the available set of conversation segments to be updated with respect to the conversation segment.

As an example, the update operation might be to turn off the conversation segment. For instance, in the conversation segment set 201 of FIG. 2, the status 271 through 276 of each respective conversation segment 211 through 216 might include whether or not the conversation segment is turned on or off. An "on" status might cause the respective conversation segment to be considered within the available set of conversation segments for purposes of executing method 300 and decision block 303. An "off" status might cause might cause the respective conversation segment to not be considered within the available set of conversation segments for purposes of executing method 300 and decision block 303. Thus, turning a conversation segment off thereby effectively removes the conversation segment from the available set of conversation segments. The conversation segment might, however, still remain in the conversation segment set in case it thereafter is turned on via a subsequent update operation. Other more permanent examples include deletion and addition of conversation segments from and to the conversation segment set.

Several examples will now be provided in which the available set of conversation segments is updated. The first example involves turning conversation segments on and off, and is represented by the following conversation segment:
+ Please deliver a pepperoni pizza to my home address {onMatch: checkStore}
− Thanks for your order. {id: orderPlaced}
− The store is closed now {id: storeClosed}

In this example there are two possible responses to the user statement "Please deliver a pepperoni pizza to my home address". If the store is open, the order is placed and the user is notified. However if the store is not open, the order cannot be paced. The conversation is dependent on an external entity. This can be similar to looking up in a database or calling a function to check the time. In this case, when there is a match, the function checkStore is run. What function checkStore may do is look up in the database to check if the store is open that day and time. If yes, the function might calls the necessary mechanism to perform the operation and sets the second response inactive as follows:
Find (orderPlaced).active=true;
Find (storeClosed).active=false;

In this case the response that will be sent to the user is addressed with orderPlaced since it is the only active one. i.e. 'Thanks for your order'. However if the operation cannot be performed, then the response marked as storeClosed can be activated as follows:
Find (orderPlaced).active=false;
Find (storeClosed).active=true;
In this case the response 'The store is closed now' will be sent to the user.

In a second example, a similar type of filtering is activated on the user's statement. For example, consider the following conversation segment:

+ Apply coupon code {id : coupon}
− You get a 10% discount.

In this case if the user says "Apply coupon code", an operation is performed. However depending on an external entity this can be turned active or inactive. The code can do the following—
Find(coupon).active=false
In this case there is no response if the recognizer actually matches since it has been marked inactive dynamically.

More generally stated, the net result of this fine-grained control over the set of available conversation segments is that the available set may migrate as the context of the conversation changes. Thus, the available set may be used to conform to the more likely set of user statements given the current context. Thus, the chances of finding an appropriate response at any given time increases since the computing system may follow the train of thought of the conversation. In the end, the computing system more realistically engages the user in helpful conversation that is more responsive to user utterances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having stored thereon computer-executable instructions that are structured such that, when executed by the one or more processors, cause the computing system to perform a method for computer-assisted conversation, the method comprising:
updating an available set of conversation segments, each conversation segment of the available set of conversation segments comprising at least one correlation between statement data and at least one computerized response, the available set of conversation segments being used by a computing system to audibly emit a response when correlated statement data is matched against a user statement, the updating comprising the following:
determining a conversation segment on which to perform an update operation;
instructing that the determined conversation segment have the update operation performed thereon to thereby cause the available set of conversation segments to be updated with respect to the determined conversation segment, the instructing including providing an addressing identifier of the determined conversation segment;
determining a plurality of additional conversation segments on which to perform corresponding update operations; and
instructing that the plurality of determined additional conversation segments have the corresponding update operations performed thereon to thereby cause the available set of conversation segments to be updated with respect to the plurality of determined additional conversation segments, a corresponding update operation for at least one of the plurality of determined additional conversation segments being different than a corresponding update operation for least one other of the plurality of additional conversation segments.

2. The computing system in accordance with claim 1, the updating comprising turning off the determined conversation segment so that the determined conversation segment is not thereafter part of the available set of conversation segments.

3. The computing system in accordance with claim 1, the updating comprising turning on the determined conversation segment so that the determined conversation segment is thereafter part of the available set of conversation segments.

4. The computing system in accordance with claim 1, the updating comprising deleting the determined conversation segment so that the determined conversation segment cannot thereafter be turned on absent the determined conversation segment being provided again to the computing system that uses the available set of conversation segments to audibly emit responses to user statements.

5. The computing system in accordance with claim 1, the updating further comprising generating the determined conversation segment.

6. The computing system in accordance with claim 1, the addressing identifier of the determined conversation segment being a class identifier to which the determined conversation segment belongs.

7. A method for computer-assisted conversation, the method comprising:
updating an available set of conversation segments, each conversation segment of the available set of conversation segments comprising at least one correlation between statement data and at least one computerized response, the available set of conversation segments being used by a computing system to audibly emit a response when correlated statement data is matched against a user statement, the updating comprising the following:
determining a conversation segment on which to perform an update operation;
instructing that the determined conversation segment have the update operation performed thereon to thereby cause the available set of conversation segments to be updated with respect to the determined conversation segment, the instructing including providing an addressing identifier of the determined conversation segment;
determining a plurality of additional conversation segments on which to perform corresponding update operations; and
instructing that the plurality of determined additional conversation segments have the corresponding update operation performed thereon to thereby cause the available set of conversation segments to be updated with respect to the plurality of determined additional conversation segments, the corresponding update operation for at least one of the plurality of determined additional conversation segments being different than the corresponding update operation for least one other of the plurality of additional conversation segments.

8. The method in accordance with claim 7, the updating comprising turning off the determined conversation segment so that the determined conversation segment is not thereafter part of the available set of conversation segments.

9. The method in accordance with claim 7, the updating comprising turning on the determined conversation segment so that the determined conversation segment is thereafter part of the available set of conversation segments.

10. A computing system comprising:
one or more processors; and
one or more computer-readable media having stored thereon computer-executable instructions that are structured such that, when executed by the one or more processors, cause the computing system to perform a method for computer-assisted conversation, the method comprising:
maintaining an available set of conversion segments at the computing system, each conversation segment of the available set of conversation segments comprising at least one correlation between statement data and at least one computerized response;
using the available set of conversation segments to perform computer-assisted conversation by, upon determining that a user statement has been made, determining whether the user statement matches statement data of a conversation segment of the available set of conversation segments, and audibly emitting the response of that conversation segment to the user; and
updating the available set of conversation segments, the updating comprising:
determining a first conversation segment on which to perform an update operation; and
instructing that the determined conversation segment have the update operation performed thereon to thereby cause the available set of conversation segments to be updated with respect to the determined conversation segment, the instructing including providing an addressing identifier of the determined conversation segment;
determining a plurality of additional conversation segments on which to perform corresponding update operations; and
instructing that the plurality of determined additional conversation segments have the corresponding update operation performed thereon to thereby cause the available set of conversation segments to be updated with respect to the plurality of determined additional conversation segments, the corresponding update operation for at least one of the plurality of determined additional conversation segments being different than the corresponding update operation for least one other of the plurality of additional conversation segments.

11. The computing system in accordance with claim 10, the updating comprising turning off the determined conversation segment so that the determined conversation segment is not thereafter part of the available set of conversation segments.

12. The computing system in accordance with claim 10, the updating comprising turning on the determined conversation segment so that the determined conversation segment is thereafter part of the available set of conversation segments.

13. The computing system in accordance with claim 10, the updating comprising deleting the determined conversation segment so that the determined conversation segment cannot thereafter be turned on absent the determined conversation segment being provided again to the computing system.

14. The computing system in accordance with claim 10, the updating comprising receiving the determined conversation segment by the computing system so that the determined conversation segment is thereafter added to the available set of conversation segments.

15. The computing system in accordance with claim 10, the updating further comprising generating the determined conversation segment.

16. The computing system in accordance with claim 10, the addressing identifier of the determined conversation segment being a class identifier to which the determined conversation segment belongs.

* * * * *